Figure 1:
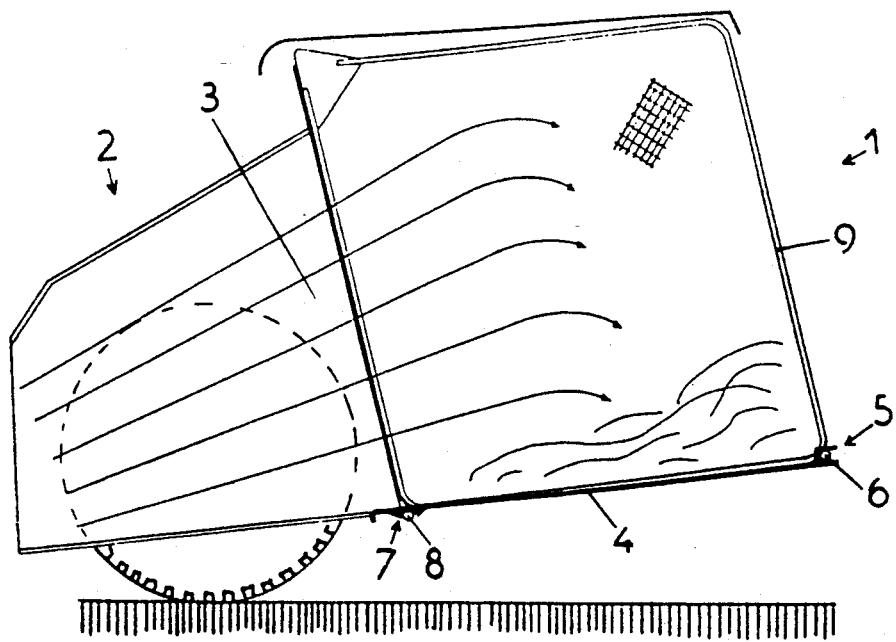

United States Patent
Wolf

[11] Patent Number: 5,157,907
[45] Date of Patent: Oct. 27, 1992

[54] COLLECTING DEVICE FOR A LAWNMOWER PROVIDED WITH A REMOVABLE BOTTOM PERMITTING DIRECTLY DEPOSITING THE CUT GRASS

[75] Inventor: Pierre Wolf, Wissembourg, France

[73] Assignee: Etesia, S.C.S., Wissembourg, France

[21] Appl. No.: 688,998

[22] Filed: Apr. 12, 1991

[30] Foreign Application Priority Data

Apr. 12, 1990 [FR] France ................... 90 04919

[51] Int. Cl.⁵ .............................................. A01D 35/00
[52] U.S. Cl. ......................................... 56/203; 56/206
[58] Field of Search .................. 56/194, 202–206, 56/320.2, 5

[56] References Cited

U.S. PATENT DOCUMENTS

| | | | |
|---|---|---|---|
| 3,002,332 | 10/1961 | Shane | 56/203 |
| 4,151,702 | 5/1979 | Brown | 56/203 |
| 4,377,063 | 3/1983 | Leaphart | 56/206 X |

FOREIGN PATENT DOCUMENTS

| | | |
|---|---|---|
| 0133987 | 3/1985 | European Pat. Off. . |
| 2557419 | 7/1985 | France . |
| 500675 | 2/1939 | United Kingdom . |
| 2081564 | 2/1982 | United Kingdom . |

*Primary Examiner*—Thuy M. Bui
*Attorney, Agent, or Firm*—Young & Thompson

[57] ABSTRACT

Device for collecting or directly depositing cut grass for a lawnmower, mounted on the rear surface of a mower (2) and applied to the ejection channel (3) of this latter. The device has a removable bottom (4) detachably connected thereto, wherein after removal of the removable bottom (4) the device permits directly depositing the cut grass if collection is not desired. The removable bottom (4) is in the form of a rigid plate provided at one end with hooks (5) adapted to coact with a lower cross member (6) of the collecting apparatus and, at its other end, with a lock (7) for locking in closed position coacting with another lower transverse member (8) parallel to the first.

6 Claims, 1 Drawing Sheet

COLLECTING DEVICE FOR A LAWNMOWER PROVIDED WITH A REMOVABLE BOTTOM PERMITTING DIRECTLY DEPOSITING THE CUT GRASS

The present invention relates to the field of the construction of lawnmowers and has for its object a collecting device permitting directly depositing the cut grass.

Generally lawnmowers are used with a gathering device or with a grass deflector if collection is not desired. Such deflectors permit, as the case may be, windrowing of the cut grass which can then be gathered by known means.

However, the use of these windrowers or deflectors requires the preliminary removal of the collecting device, followed by the emplacement and securement of a deflector, such that the user is tempted simply to take off the collector without emplacing the deflector and thus to expose himself to the possible risk of projected stones or other dangerous objects.

It has been proposed to overcome these drawbacks by the provision of collecting devices provided with a movable wall, preferably a lower wall, forming a deflector, particularly in DE-A-3 328 081 or again by the provision of a rigid element in the form of a cover adapted for the reception of a bag or another collecting receptacle and providing, when this latter is removed, a deflector (DE-A-3 130 898).

These known deflectors however comprise in their operative position impact plates violently deflecting projected material downwardly, giving rise to intense development of pressures and presenting by virtue of a restriction of the ejection channel a danger of plugging in high grass.

The present invention has for its object to overcome the drawbacks of known deflectors.

It thus has for its object a collecting device for cut grass for a lawnmower characterized in that it is provided with a removable bottom and in that it permits, after retraction of the movable bottom, in use of the mower, depositing directly the cut grass on the previously mowed surface.

Figure 2:
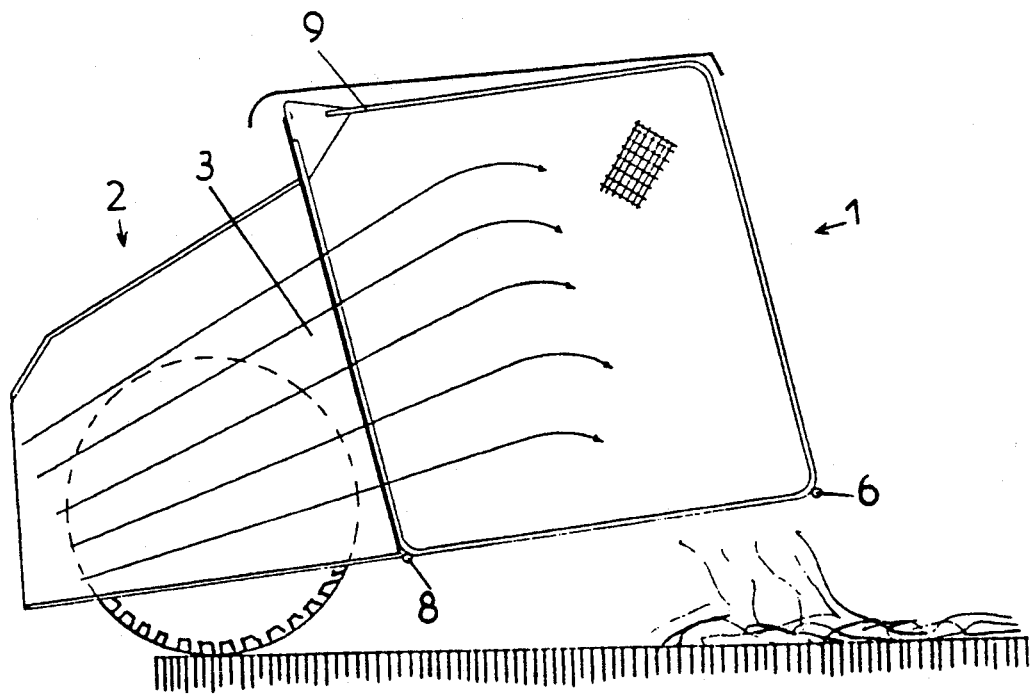

The invention will be better understood from the following description, which relates to a preferred embodiment, given by way of non-limiting example, and explained with reference to the accompanying schematic drawing, in which:

FIG. 1 is a side elevational and cross-sectional view of the device according to the invention, in its grass collecting position, and FIG. 2 is a view similar to that of FIG. 1 showing the device with the removable bottom retracted and permitting depositing directly the cut grass.

FIGS. 1 and 2 of the accompanying drawing show a device 1 for collecting or directly depositing the cut grass, for a lawnmower, mounted on the rear surface of a mower 2 and applied to the ejection channel 3 of this latter.

According to the invention, the device 1 is provided with a removable bottom 4 and preferably comprises, after retraction of the removable bottom, a device permitting directly depositing the cut grass if its collection is not desired.

The removable bottom 4 is preferably in the form of a rigid plate provided at one end with hook means 5 adapted to coact with a lower cross member 6 of the collecting device and, at its other end, means 7 for locking in closed position coacting with another lower transverse member 8 parallel to the first.

The hook means 5 are preferably constituted by elements in the form of a fork or by a transverse U-section fixed on the edge of an end of the plate forming the bottom 4 or forming an integral part of this edge.

The locking means 7 in closed position are constituted either by elements in the form of clips provided on the plate forming the bottom 4 near the opposite edge to that carrying the means 5 or integral with the plate, or by a shaped groove provided in said plate during its manufacture.

The lower crosspieces 6 and 8 adapted to coact with the hook means 5 and with the locking means 7 are preferably constituent profiles of an infrastructure frame of the device 1 or of a frame connected to the lower surface of said device 1.

Thus, it is possible to remove very easily the removable bottom 4 by simply freeing the locking means 7, for example by raising them, then by withdrawing the hook means 5 from the lower transverse member 6, this bottom 4 then being adapted to be withdrawn.

According to another characteristic of the invention, the device 1 can preferably be in the form of a cloth bag of synthetic material provided with a hooking frame 9, of metal rod or tube, adapted to coact with the ejection channel 3 of the mower and comprising the support for the removable bottom 4. Such a bag is particularly appropriate to use because it absorbs the impact of the material thrown by the cutting blade or blades and permits under the influence of gravity the gentle deposition of the projected material behind the mower. The air permeability of the cloth permits in turn evacuation through the walls of the device of the greater part of the airflow engendered by the cutting blade or blades and thus substantially reduces the development of pressure.

Thanks to the invention it is possible to provide an apparatus for collecting cut grass for lawnmowers which, by simple retraction of its bottom, provides an apparatus permitting directly depositing the cut grass.

Thus it is possible particularly in the case of mowers with a wide cutting swath such as particularly self-propelled mowers, to omit an expensive deflector.

Of course, the invention is not limited to the embodiment described and shown in the accompanying drawing. Modifications remain possible, particularly as to the construction of the various elements or by substitution of technical equivalents, without thereby departing from the scope of protection of the invention.

I claim:

1. Device for collecting or directly depositing on the ground cut grass for a lawnmower having a rearwardly opening ejection channel (3), mounted on the rear surface of a mower (2) surrounding said ejection channel (3), said device having a removable bottom (4) detachably connected thereto, whereby after removal of the removable bottom (4) the device directly deposits the cut grass on the ground if collection is not desired.

2. Device according to claim 1, wherein the removable bottom (4) is in the form of a rigid plate provided at one end with hooking means (5) adapted to coact with a lower cross member (6) of the collecting apparatus and, at its other end, with means (7) for locking in closed position coacting with another lower transverse member (8) parallel to the first.

3. Device according to claim 2, wherein the hooking means (5) are constituted by elements in the form of a fork or by a U-profiled cross member secured to the edge of an end of the plate forming the bottom (4) or forming an integral part of this edge.

4. Device according to claim 2, wherein the means (7) for locking in closed position are constituted either by an element in the form of clips provided on the plate forming the bottom (4) near the edge opposite that carrying the means (5) or integral with the plate, or by a shaped groove provided in said plate during its manufacture.

5. Device according to claim 2, wherein the lower cross members (6 and 8) adapted to coact with the hooking means (5) and with the locking means (7) are constituent profiles of an infrastructure frame of the device (1) or of a frame carried by the lower surface of said device (1).

6. Device according to claim 1, wherein it is in the form of a cloth bag of synthetic material provided with a hooking frame (9) of metal rod or tubing, adapted to coact with the ejection channel (3) of the mower and forming the support for the removable bottom (4).

* * * * *